Oct. 25, 1932.　　　L. WITTENBERG　　　1,884,471
PAVING AGGREGATE AND PROCESS OF PRODUCING SAME
Filed April 17, 1926
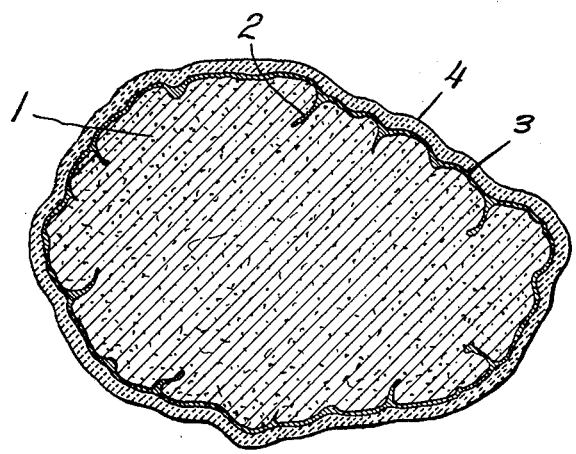
Lester Wittenberg, INVENTOR
BY
Daniel J. Mayne ATTORNEY Patented Oct. 25, 1932

1,884,471

UNITED STATES PATENT OFFICE

LESTER WITTENBERG, OF NEW ROCHELLE, NEW YORK, ASSIGNOR TO THE BARRETT COMPANY, A CORPORATION OF NEW JERSEY

PAVING AGGREGATE AND PROCESS OF PRODUCING SAME

Application filed April 17, 1926. Serial No. 102,670.

This invention relates to methods for preparing road making materials or aggregates, and to the product so produced.

It is among the objects of this invention to prepare an aggregate having a coating which will adhere tenaciously to the aggregate so that separation of the coating therefrom is not apt to occur under the strain of heavy traffic.

In the past, various methods have been used in building roads and in preparing aggregates for road construction but failure of the road quite often occurs when using materials constructed according to prior known methods.

I am aware of U. S. Patents #174,648 to Van Camp and #932,941 to Amies, which define the washing and saturation of the aggregate with a thin oil or solvent before coating the aggregate with bitumen. I am also aware of the practice of building roads involving the application of loose stone or mineral matter to a prepared foundation for the road, then applying over the layer of loose stone a binder consisting of a comparatively thin liquid bituminous material and thereafter top-dressing the surface having the binding material applied thereto with a relatively thick bitumen.

One of the chief difficulties with these and other prior methods is that the coating does not properly adhere to the mineral matter or stone because of poor penetration of the dust layer and voids of the stone and under the strain of heavy traffic on the road in which the material is used, the bituminous bond or coating breaks away from the stone because of poor adherence thereto, and as a result, the road "fails" or breaks down. Also, after the road is used a short time, the coating upon the surface aggregate will wear away, the bond between the stone and coating will break down and extensive weathering both from without and within will occur because of the fact that the coating does not adhere properly to the stone or mineral matter.

When using such a process as is described by Van Camp or Amies, the aggregate is merely washed with a flux; this does not cause the single coating of viscous tarry material, applied after the wash treatment as described by the patentees, to penetrate the voids in the aggregate any the better. In the case of the method of building up roads above outlined it is impossible for the primary coating to properly penetrate the voids of the stone, or even to adhere properly thereto, because of the presence of dust upon and between the stone particles and because the coating will not even have the opportunity to contact with each piece of stone, much less to properly penetrate and coat it.

By my invention, a thorough penetration of all the voids of the stone particles, as well as the dust layer adhering thereto, is obtained by immersing the stone particles in, or mixing it with a cementitious bitumen of a rather thin consistency i. e. low viscosity. Thereafter the initially coated stone is subjected to a second coating of cementious bituminous material which is solid or semi-solid at atmospheric temperatures, that is to say, of appreciable higher viscosity than the initial coating material.

The drawing, forming a part of this application, shows a cross-section of a piece of aggregate made in accordance with my invention.

The mineral particles which I treat may vary from a rather hard, dense mineral, such as trap rock, to a more porous mineral such as slag or the like, depending upon the supply most easily available at the point where the mineral is being treated. The rock, stone or slag is broken up in the usual manner into suitable sizes, such as that shown at 1 in the drawing. Each piece of stone will have more or less of a coating of dust thereon but by using my invention, the disadvantage of such a coating of dust is overcome.

The crushed stone is heated in any suitable manner, such as in a rotary drum, to a temperature sufficient merely to drive out the moisture contained therein. The stone is then immersed or mixed (preferably while still warm) in or with a rather thin tarry bitumen having a specific viscosity at atmospheric temperature of from 8 to 35. The heat of the mineral particles raises the temperature, somewhat, of the saturant or primary coating and aids in its penetration of the mineral particles.

Where the initial coating operation is done by mixing, the amount of tarry bitumen required for the coating is predetermined and added to the mineral particles in the mixing operation. Where the stone particles are immersed for saturation, they are thereafter drained before applying the secondary coating. The liquid bitumen due to its relative thinness and the cementitious nature thereof thoroughly penetrates the pores and voids of the mineral particles, as shown at 2, and also penetrates the dust coating upon the aggregate. A thin coating 3 of the bitumen adheres tenaciously to the body of the mineral particles, the bitumen having penetrated the layer of dust thereon, as previously mentioned.

Bitumen such as pitch or asphalt, solid or semi-solid at atmospheric temperatures, is heated until in a relatively fluid condition. The once coated mineral material, is then mixed with the melted pitch or asphalt and receives a secondary coating of the latter, which adheres tenaciously to the primary coating, which in turn adheres tenaciously to the body of the aggregate.

The aggregate may be used while hot or may be allowed to cool and stored for use. The secondary coating, shown at 4, is usually relatively thicker than the primary coating, because of the greater viscosity of the secondary coating material.

The primary coating may be either a tar distillation residue or asphaltic base petroleum of relatively low viscosity and correspondingly high penetrability as compared with that of the final coating material. To increase the penetrating strength of the low viscosity material, as for example, when the coating material is applied at reduced temperatures, as is the case in very cold weather, a small amount of solvent oil may be added thereto, i. e., the initial coating material may be cut back or fluxed with solvent oil. As before pointed out, the specific viscosity of the initial coating may vary between 8 and 35, depending on the mineral material being coated. The more porous the stone or other mineral material, the more viscous the initial coating material may be. Initial coating material having a specific viscosity of from 8 to 35 is substantially non-volatile at temperatures encountered in use of the aggregate, including solar conditions in summer, and hence, forms a permanent coating of appreciable thickness on the mineral material, which coating, due to the difference in viscosity, differs from, and bonds with, the coating formed by the application of the higher viscosity bituminous material applied as the second coat.

The secondary coating may be either coal tar pitch or asphalt, which is solid or semi-solid at atmospheric temperature, but which, on the other hand, is not brittle when cool.

The aggregate produced according to my invention may be used, as such, in the building of roads or a layer of coarse aggregate prepared according to my invention may be used to form the foundation of the road, and a layer of fine aggregate, treated according to my invention, deposited upon the coarse layer. The road so constructed may then be thoroughly rolled in order to compact the aggregate and bond same together, as is usually the procedure in working with similar materials.

It has been found that the failure of roads constructed with aggregate which has been coated according to prior methods, is due to the fact that the bituminous coating separates from the mineral matter under heavy traffic, and does not form a proper bond between the various aggregates used in the construction of the road and extensive weathering and disintegration of the aggregate, both from without and from within, will occur. When aggregate prepared according to my invention is used, failure due to the above causes does not occur because as above set forth, any dust layer upon the mineral matter has been thoroughly penetrated, as well as the voids thereof. Thus it will be readily understood, that the primary coating tenaciously adheres to the body of the mineral matter and that the secondary coating adheres to and fuses with the primary coating so that the two coatings are, in the finished product, bonded together. No breaking away of the coating from the body of the aggregate can, therefore, occur. Thus, by my invention, I produce a tenacious coating, which prevents weathering and disintegrating of the aggregate as well as a coating which will stand up under traffic because the secondary coating has sufficient "body" to withstand the wear imposed upon it.

When a road bed of this material is subjected to heavy traffic, there is no loosening of of the bonding material from the body of the aggregate, and consequently the road will outlast those constructed with aggregates prepared according to prior methods.

I claim:

1. The method of preparing paving aggregate which comprises saturating the aggregate body with a solution of cementitious tarry bitumen residue, having a specific viscosity of between 8 and 35, and then coating the resulting product with bitumen which is substantially solid at atmospheric temperature.

2. The method of preparing paving aggregate which comprises heating the aggregate body sufficiently to drive out substantially all moisture therein, saturating the aggregate with a solution of tarry bitumen residue having a specific viscosity of between 8 and 35, and then coating the resulting product with bitumen which is substantially solid at atmospheric temperature.

3. A paving material comprising mineral particles saturated and coated with a cementitious thin bitumen having a specific viscosity of from 8 to 35, forming a permanent coating of appreciable thickness on said mineral particles and having a coating of more viscous bitumen residue bonding with said initial coating.

4. A paving material comprising an aggregate body having an initial permanent coating of appreciable thickness of a cementitious tarry bitumen residue having a specific viscosity of from 8 to 35, and a subsequent thicker coating of bitumen which is substantially solid at atmospheric temperatures.

5. A paving material comprising a dry aggregate body having an initial permanent coating of appreciable thickness of cementitious tarry bitumen residue having a specific viscosity of from 8 to 35, and a subsequent thicker coating of asphalt of a viscosity greater than that of the cementitious tarry bitumen.

In testimony whereof I affix my signature.
LESTER WITTENBERG.